(12) United States Patent
Tömek

(10) Patent No.: US 11,659,810 B2
(45) Date of Patent: May 30, 2023

(54) AUTOMATIC WASHING SYSTEM FOR BUCKET MILKING MACHINE

(71) Applicant: LAKTO HAYVANCILIK TEKNOLOJILERI SANAYI VE TICARET LIMITED SIRKETI, Cigli-Izmir (TR)

(72) Inventor: Basat Tömek, Cigli-Izmir (TR)

( * ) Notice: Subject to any disclaimer, the term of this patent is extended or adjusted under 35 U.S.C. 154(b) by 165 days.

(21) Appl. No.: 17/044,756

(22) PCT Filed: May 22, 2019

(86) PCT No.: PCT/TR2019/050364
§ 371 (c)(1),
(2) Date: Oct. 1, 2020

(87) PCT Pub. No.: WO2020/046240
PCT Pub. Date: Mar. 5, 2020

(65) Prior Publication Data
US 2021/0161094 A1 Jun. 3, 2021

(30) Foreign Application Priority Data
May 28, 2018 (TR) ................................ 2018/07556

(51) Int. Cl.
*A01J 7/02* (2006.01)
*B08B 9/032* (2006.01)
(Continued)

(52) U.S. Cl.
CPC ............... *A01J 7/025* (2013.01); *A01J 7/027* (2013.01); *B08B 9/0321* (2013.01);
(Continued)

(58) Field of Classification Search
CPC . A01J 7/025; A01J 7/027; A01J 7/022; B08B 9/0321; B08B 9/0839; B08B 2209/032
See application file for complete search history.

(56) References Cited

U.S. PATENT DOCUMENTS 3,119,400 A 1/1964 Bihler
4,452,268 A 6/1984 Icking et al.

FOREIGN PATENT DOCUMENTS

CZ 3931 U1 10/1995
CZ 3931 U1 * 12/1995
(Continued)

OTHER PUBLICATIONS

Machine translation: CZ3931U1; Racek et al. (Year: 1995).*
(Continued)

*Primary Examiner* — Natasha N Campbell
(74) *Attorney, Agent, or Firm* — Phil IP Law Inc.; Narek Zohrabyan; Karen 'Kirk' Galoyan

(57) ABSTRACT

The present invention is related to the type of milking machines with milk bucket or trolley bucket milking machine used for milk production mainly in small-medium scaled animal breeding enterprises.
The invention is particularly related to an automatic washing method which is used for washing the milking machine with milk bucket after milking automatically and also both increases the quality of the milk and prevents damage to the udder, comprises pre-rinsing, washing, final-rinsing process steps and to a milking machine with a milk bucket having an automatic washing system which comprises detergent dosing unit, washing boiler, milk can, milking cluster, washing jetter, washing line, liquid drafting line in the milk bucket, milk bucket vacuum connection, washing boiler vacuum connection, boiler-milk bucket vacuum orientation and vacuum discharge valve, boiler and milk bucket interim valve, washing line valve, drainage valve, drainage line, heating element, cold water intake valve, hot water intake valve, float bottom level sensor, float upper level sensor.

4 Claims, 1 Drawing Sheet

(51) Int. Cl.
   *B08B 9/08* (2006.01)
   *B08B 9/093* (2006.01)
(52) U.S. Cl.
   CPC ............ *B08B 9/0839* (2013.01); *B08B 9/093* (2013.01); *B08B 2209/032* (2013.01)

(56) References Cited

FOREIGN PATENT DOCUMENTS

| CZ | 4733 U1 | 4/1996 |
| GB | 1111818 A | 5/1968 |
| WO | 1994023564 A1 | 10/1994 |
| WO | 2015171067 A1 | 11/2015 |

OTHER PUBLICATIONS

International Search Report in International Application No. PCT/TR2019/050364 dated Apr. 1, 2020.
Written Opinion of the International Searching Authority in International Application No. PCT/TR2019/050364 dated Apr. 1, 2020.
EPO Search Report in Application No. EP19855056A2 dated Oct. 7, 2021.
Written Opinion of EPO in Application No. EP19855056A2 dated Oct. 7, 2021.
TurkPatent Search Report in Application No. TR-2018/07556 dated Oct. 9, 2020.
TurkPatent Examination Report in Application No. TR-2018/07556 dated Mar. 2, 2022.

* cited by examiner

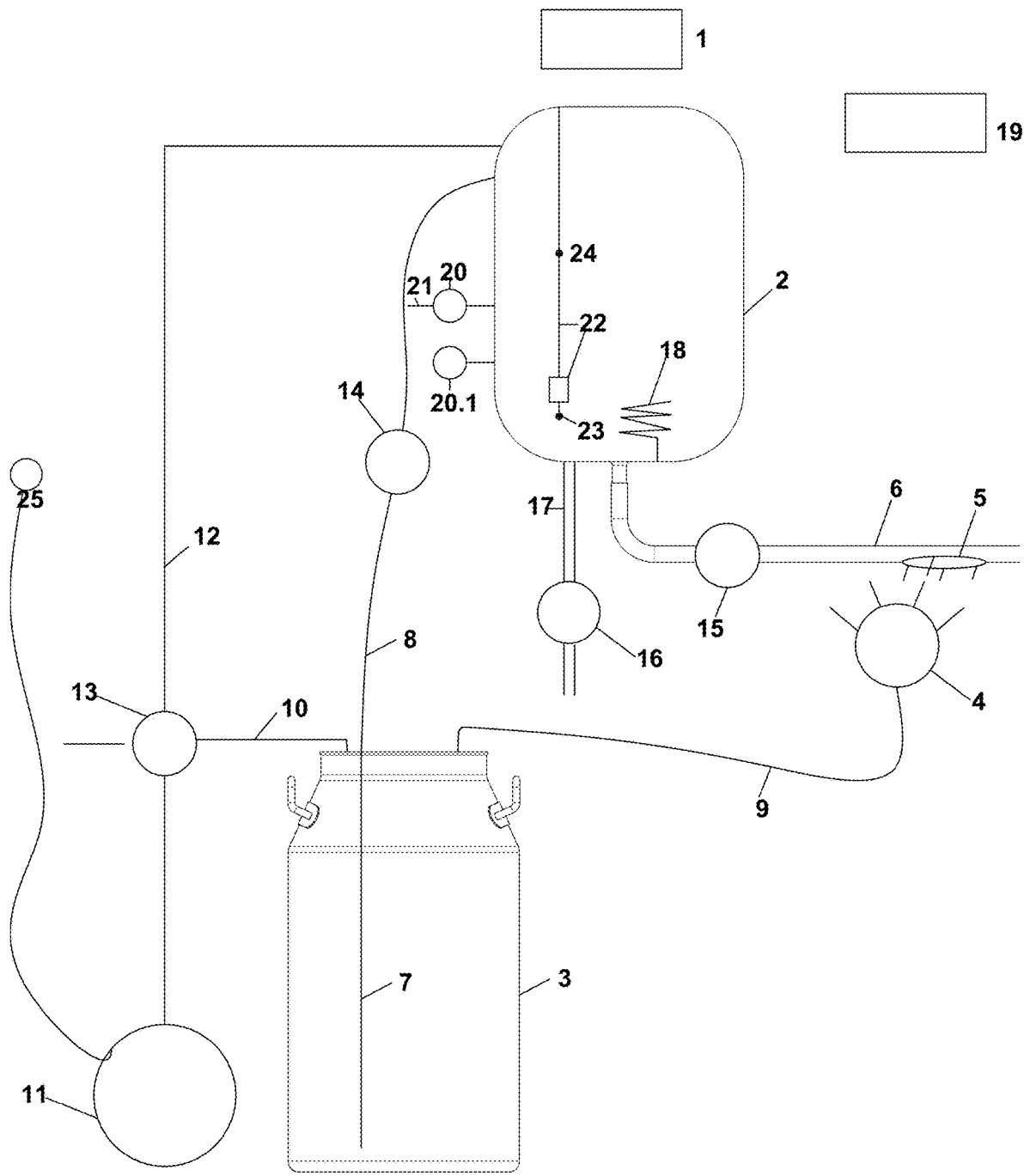

AUTOMATIC WASHING SYSTEM FOR BUCKET MILKING MACHINE

TECHNICAL FIELD

This invention is related to the type of washing system for milking machines with milk bucket used for milk production of small-medium scaled dairy farms.

The invention is related to an automatic washing method which is used for automatically washing the bucket milking machine after milking. It is related to a milking machine with a milk bucket that has an automatic washing system which comprises pre-rinsing, washing, final-rinsing process steps and of detergent dosing unit, washing boiler, milk can, milking cluster(s), washing jetter, washing line, liquid drafting line in the milk can, milk can vacuum connection, washing boiler vacuum connection, boiler-milk can vacuum orientation and vacuum discharge valve, boiler and milk can interim valve, washing line valve, drainage valve, drainage line, water heating resistance, cold water intake valve, hot water intake valve, float bottom level sensor, float upper level sensor. This invention both increases the quality of the milk and prevents giving damage to the udder.

Previous Technic

In the previous technic, the milk milked by the machines are collected in to a milk bucket. The milker empties the milk bucket by transferring the milk to another bigger container/bucket at the end of milking and thus the milker prepares the machine for the next animal to be milked. Said milking is very difficult and it is very tiring for the milker.

As it is known, the milking machines must be washed appropriately after each milking process without any delay. Delay in washing, not making a full wash or not making any wash causes proliferation of the bacteria in a very fast manner within the milking equipment. These bacteria cause infection on the udder of the animals at the next milking and also infecting the milk.

Due to the infection of the udders, besides the bacteria contaminating the milk via the milking equipment, the somatic cell in the milked milk also increases, increased somatic cell affects the milk production in a negative manner and the raw milk quality is impaired. As a result of the impaired milk quality, the milk is processed with extended duration and/or at high temperatures during pastorization, therefore energy consumption increases. The pH level of milk with high bacteria load increases, thus it substantially decreases the yield of milk products, excellence and product quality in the production of dairy products such as yoghurt, cheese etc.

The producers usually avoid washing the bucket milking machine or perform an insufficient washing because it requires an intensive labor. As a result of this, the udder diseases increase (Mastitis), the quality of the milk cannot reach to the required level. The raw milk quality targets specified in the declaration No 2000/6 of the Ministry of Agriculture (Number of total bacteria<100.000 number/ml, number of somatic cells<400.000 number/ml) can not be reached yet due to the fact that the milking systems of small-medium scaled enterprises are not washed properly, in contrast the current numbers of total bacteria and somatic cells are very far away from the targeted values as of the year 2018 in Turkiye and in many other developing countries.

As a result, due to insufficiency of the current solutions for solving the abovementioned problems within the current technics, it is necessary to make a development in the relevant technical field for a new washing system and equipment.

THE AIM OF THE INVENTION

The present invention solves all of the abovementioned problems at the same time. Said invention is in general related to a method which provides excellent automatic washing of all surfaces that contact with the milk in the bucket milking machine.

The most important aim of the present invention is to increase the milk production and raw milk quality by decreasing the somatic cells besides the bacteria contamination to the milk by the milking equipment by means of preventing the udders to be infected due to dirty milking equipment.

Another aim of the present invention is to provide appropriate washing of the milking machine in a standard and sufficient manner by bringing an easy solution to the milker who refrain from washing the milking machine because it eliminates the washing labor of the milker.

Another aim of the present invention is to enable washing of the milking machines appropriately without any delay after each milking process, due to its ease of use.

The most important aim of the present invention is to protect the health of other animals in the herd by means of preventing the infection of the udders.

Another aim of the present invention is to reduce the energy consumption by providing treatment of the milk within a shorter period of time and/or at low temperature during process at milk factories.

Another aim of the present invention is both to perform standard milking process by means of reducing the initiative of the milker on the milking machine and to improve the working conditions.

In the direction of said aims, the present invention which eliminates the current embodiments is an automatic washing method which is used for automatically washing the milking machine with milk bucket after milking and it also increases the quality of the milk and prevents damage to the udder, comprises pre-rinsing, hygiene provision, final rinsing process steps.

In the direction of said aims, the present invention is an automatic washing system for bucket milking machine which is used for automatically washing the bucket milking machine after milking, eliminates the disadvantages in the current situation, increases the quality of the milk and prevents damage to the udder, comprises of pre-rinsing, washing, final-rinsing process steps and includes detergent dosing unit, water heater, milking bucket, milking cluster(s), washing jetter, washing line, liquid drafting line in the milk can, milk can vacuum connection, washing tank vacuum connection, boiler-milk can vacuum orientation and vacuum discharge valve, boiler and milk can interim valve, washing line valve, drainage valve, drainage line, water heating resistance, cold water intake valve, hot water intake valve, float bottom level sensor, float upper level sensor.

Clean Version

Said invention will be a preferred product in the sector with its present condition and a simple system. Therefore it will provide a commercial success.

The structural and characteristic features of the present invention will be understood clearly by the following drawings and the detailed description made with reference to these drawings. For this reason the evaluation shall be made by taking these FIGURES and the detailed description into consideration.

FIGURES CLARIFYING THE INVENTION

FIGURE-1 is a drawing used for illustrating the washing system of the milking system subject to the present invention.

REFERENCE NUMBERS

1. Detergent dosing unit,
2. Washing tank and boiler,
3. Milk bucket,
4. Milking cluster,
5. Washing assembly,
6. Washing line,
7. Inter milk bucket liquid suction pipe,
8. Inter milk bucket liquid suction hose,
9. Milk hose,
10. Milk bucket vacuum connection,
11. Vacuum pump,
12. Washing tank/boiler vacuum connection,
13. A vacuum direction and vacuum discharge valve—4 way valve,
14. Boiler and milk can interim valve,
15. Washing line valve,
16. Drainage valve,
17. Drainage line,
18. Heating element,
19. Control circuit/panel,
20. Cold water intake valve,
    20.1 hot water intake valve
21. Water feeding line,
22. Float,
23. Float bottom level sensor,
24. Float upper level sensor,
25. Electrical plug The present invention will be understood more clearly with the abovementioned reference numbers and description referring to the attached FIGURES.

DETAILED DESCRIPTION OF THE INVENTION

The present invention is shown in FIGURE-1 for illustrative purposes. In order to automatically wash the milking machine with milk bucket after milking process, first of all milking equipment comes near to the washing station for automatic washing, if it is a mobile milking machine, and the plug (25) of the vacuum pump is plugged into the socket on the control panel (19), inter milk bucket liquid suction hose (8), inter milk bucket liquid suction pipe (7) and milk bucket vacuum orientation and vacuum discharge valve hose (12) are plugged into the relevant sockets, the milking cluster (4) is fitted onto the washing jetter (5) and finally the start wash button is pressed on the control panel (19) and automatic washing is started. After this phase automatically, pre-rinsing, washing with the solution consisting of hot water and detergent and final rinsing process steps are applied respectively.

For pre-rinsing; cold water is taken into the boiler from the cold water intake valve (20); when the water amount taken into the washing tank and boiler (2) reaches to the required level, it cuts water intake by triggering the upper level sensor (24) of the float (22), operates the vacuum pump (11). At this phase a vacuum direction and vacuum discharge valve (13) while transferring the vacuum to the milk bucket, interim valve between boiler-milk bucket (14) is in a closed position, washing line valve (15) is open; drainage valve (16) is closed. The vacuum pump (11) takes the rinsing water within the washing tank and boiler (2) into the milk bucket (3) by passing through the washing jetter (5) and milking cluster (4). During this stage together with the reduction of the water in the boiler, the float of the boiler (22) triggers the lower level sensor (23); the washing line valve (15) is closed, the boiler and milk bucket interim valve (14) is opened. Together with the opening of this valve, to the vacuumed environment within the milk bucket (3), a sudden atmospheric air inlet is provided by means of the inter milk bucket liquid suction pipe (7) up to the bottom point of the milk bucket and after the water within the milk bucket (3) is provided to all points in the milk bucket in a pressurized manner thus rinsing is provided. After this process the vacuum direction and vacuum discharge valve (13) directs the vacuum to the washing boiler vacuum connection (12); it allows the atmospheric air way to the milk bucket vacuum connection (10). Due to the increased vacuum within the washing tank and boiler (2), the dirty rinsing water within the milk bucket (3) is drafted into the washing tank and boiler (2) through the inter milk bucket liquid suction pipe (7) because the boiler-milk bucket interim valve (14) is open. When the whole dirty water is drafted into the washing tank and boiler (2), the vacuum pump (11) is closed; the dirty rinsing water is drained by mean of opening the drainage valve (16). Therefore the pre rinsing process is completed.

After the pre-rinsing stage, the system passes to the washing stage with the solution consisting of the hot water and detergent. At this stage detergent dosing unit (1) gives a sufficient amount of detergent into the washing tank and boiler (2). If there is any external hot water source in the enterprise, hot water is taken into the washing tank and boiler (2) by means of the hot water valve (20.1); if there is no hot water source then water is taken from the cold water valve (20) and the heating element (18) starts to work until the washing solution is heated to the predetermined temperature. Water intake into the washing tank and boiler (2) stops when the water level in the washing tank and boiler (2) triggers the upper level sensor (24) of the float (22); the system waits for reaching the solution temperature up to the required level. The water within the washing tank and boiler (2) is brought to the required temperature by means of the heating element (18) and is brought to the required level, then the float upper level sensor (24) is triggered and the vacuum pump (11) is operated. At this stage the vacuum direction and vacuum discharge valve (13) transfers the vacuum into the milk bucket (3), the boiler-milk bucket interim valve (14) is closed, the washing line valve (15) is opened, and the drainage valve (16) is closed. The vacuum pump (11) drafts the solution within the washing tank and boiler (2) into the milk bucket (3) through the washing jetter (5) and milking cluster (4). In this case, the solution amount within the washing tank and boiler (2) is reduced and the lower level sensor (23) of the float (22) is triggered, then the washing line valve (15) is in a closed position, the boiler-milk bucket interim valve (14) is in an opened position. When the boiler-milk bucket interim valve (14) opens, the vacuum in the milk bucket (3) provides sudden atmospheric air inlet to the environment by means of the inter milk bucket liquid suction pipe (7) which reaches to the lower-most point of the milk bucket, then the washing process of the system is provided by reaching with the solution in the milk bucket (3) to all points within the milk bucket (3) in a pressurized manner. After this process the vacuum direction and vacuum discharge valve (13) directs the vacuum to the washing boiler vacuum connection (12); it allows the atmospheric air way to the milk bucket vacuum connection (10). Due to the increased vacuum within the washing tank and boiler (2), the solution within the milk bucket (3) is drafted into the washing tank and boiler (2) through the inter milk bucket liquid suction pipe (7) because the boiler-milk bucket interim valve (14) is open. When the whole solution is drafted into the washing tank and boiler (2), the a vacuum direction and vacuum discharge valve (13) transfers the vacuum into the milk bucket (3), the boiler-milk bucket interim valve (14) is in a closed position, the washing line valve (15) is in an opened position, and the drainage valve (16) is in a closed position. The vacuum pump (11) drafts the current solution within the washing tank and boiler (2) by means of passing through the washing jetter (5) and milking cluster (4) and then redrafts it into the milk bucket (3) by means of the milk hose (9). This process is repeated several times and all surfaces in contact with the milk in the system are washed. After all of the surfaces are washed with the solution and hot water, the solution is drafted into the washing tank and boiler (2) for the last time, then the vacuum pump (11) is closed, the drainage valve (16) is opened and the solution is drained.

The system passes to the final rinsing stage after the washing stage. At the final rinsing stage first of all cold water is taken into the washing tank and boiler (2) by means of the water valve (20), when the water level which is filled into the washing tank and boiler (2) reaches the required amount, water intake is stopped by means of triggering the upper level magnetic sensor (24) of the float (24). The control panel (19) actuates the vacuum pump (11). At this stage, the a vacuum direction and vacuum discharge valve (13) within the system transfers the vacuum to the milk bucket, the boiler-milk bucket interim valve (14) is in a closed position, the washing line valve (15) is in an opened position, and the drainage valve (16) is in a closed position. The vacuum pump (11) drafts the rinsing water within the washing tank and boiler (2) into the milk bucket (3) through the washing jetter (5) and the milking cluster (4).

Together with the reduction of the water within the washing tank and boiler (2), the lower level sensor (23) of the float (22) is triggered; it closes the washing line valve (15), opens the boiler-milk bucket interim valve (14). When this valve is opened, to the vacuumed environment in the milk bucket (3), a sudden atmospheric air inlet is provided by means of the inter milk bucket liquid suction pipe (7) which reaches to the lowermost point of the milk bucket, the final rinsing is provided by means of reaching to all points with the water in the milk bucket (3) in a pressurized manner.

After this process, the a vacuum direction and vacuum discharge valve (13) directs the vacuum to the washing boiler vacuum connection (12); it allows the atmospheric air way to the milk bucket vacuum connection (10). Due to the increased vacuum within the washing tank and boiler (2), the dirty rinsing water within the milk bucket (3) is drafted into the washing tank and boiler (2) through the inter milk bucket liquid suction pipe (7) because the boiler-milk bucket interim valve (14) is open. When the whole water is drafted into the washing tank and boiler (2), the vacuum pump (11) is closed; the final rinsing water is drained by means of opening the drainage valve (16).

The boiler-milk bucket interim valve (14), the washing line valve (15) and the drainage valve (16) are valves operated by actuators which open and close the passages. The a vacuum direction and vacuum discharge valve (13) are valves, that closes the free air passage of one side when vacuum is oriented to that side, and at the same time cuts the vacuum feeding of the other side, opens the free air passage of the side whose vacuum is cut previously.

The protection scope of this application is determined in the claims section; it certainly cannot be limited to the above descriptions given for the purpose of example/illustration, it is clear that a qualified person in the technic can present the novelty presented within the invention with similar embodiments and/or can apply this embodiment used in the relevant technical field to other fields of similar aim. Therefore it is clear that such embodiments will lack novelty and particularly the criteria to exceed the present state of the art.

What is claimed is:

1. A method for automatically washing a bucket milking machine comprising the steps of:
    a pre-rinsing stage of step 1a, actuation of a vacuum pump (11) and cutting water intake, both as a result of a trigger of a float upper level sensor (24) of a float (22) when cold water from water intake valve (20) received in a washing tank and boiler (2) reaches to a required level within the washing tank and boiler (2);
    a step 1b, suctioning of a rinsing water within the washing tank and boiler (2) by means of the vacuum pump (11) through a washing assembly (5) and milking cluster (4) into a milk bucket (3), while a boiler and milk can interim valve (14) and a drainage valve (16) are closed, and a washing line valve (15) is open;
    a step 1c, with the reduction of the rinsing water within the washing tank and boiler (2), a float bottom level sensor (23) of the float (22) triggers a closing of the washing line valve (15) and at the same time opening the boiler and milk can interim valve (14);
    a step 1d, providing a sudden atmospheric air inlet by means of an inter milk bucket liquid suction pipe (7) which extends to the lowermost point of the milk bucket (3) through an opening of the boiler and milk can interim valve (14);
    a step 1e, rinsing through transferring the rinsing water to all points within the milk bucket (3) in a pressurized manner with the help of the sudden atmospheric air inlet;
    a step 1f, providing an atmospheric airway into a milk bucket vacuum connection (10) by means of the vacuum direction and vacuum discharge valve (13) and directing vacuum suction of the vacuum pump (11) to a washing boiler vacuum connection (12) by means of a vacuum direction and vacuum discharge valve (13);
    a step 1g, suctioning of dirty rinsing water within the milk bucket (3) through the inter milk bucket liquid suction pipe (7) into the washing tank and boiler (2), by means of the increased vacuum within the washing tank and boiler (2);
    a step 1h, closing the vacuum pump (11) after suctioning all of the dirty rinsing water from the milk bucket (3), and opening a drainage valve (16) to drain dirty rinsing water from washing tank and boiler (2);
    a washing stage of step 2a, in case of presence of any external hot water source, receiving a hot water into the washing tank and boiler (2) by means of a hot water intake valve (20.1), otherwise, receiving cold water from the cold water intake valve (20) and heating to a predetermined temperature by a water heating element (18);

a step 2b of repeating steps 1b, 1c, 1d, 1e, 1f, and 1g in that sequence multiples times, and terminating the repeated steps by engaging step 1-h; and as a final rinsing stage of step 3, executing steps 1a, 1b, 1c, 1d, 1e, 1f, 1g, and 1h, in that sequence.

2. The method for automatically washing the bucket milking machine of claim 1, further comprising in step 2a of adding a cleaning detergent into the washing tank and boiler (2) from a detergent dosing unit (1).

3. A washing machine, for washing a bucket milking machine automatically after milking, comprising:
- at least one inter milk bucket liquid suction hose (8) connected on its upper end to at least one washing tank and boiler (2);
- at least one inter milk bucket liquid suction pipe (7) connected on its upper end to a lower end of the at least one inter milk bucket liquid suction hose (8), wherein a lower end of the at least one inter milk bucket liquid suction pipe (7) is disposed towards a bottom of a milk bucket (3);
- at least one milk bucket vacuum connection (10);
- at least one washing boiler vacuum connection (12) which on its upper end connected to the washing tank and boiler (2) and at a lower end connected to at least one vacuum direction and vacuum discharge valve (13);
- the at least one vacuum direction and vacuum discharge valve (13) being directly connected to the at least one milk bucket vacuum connection (10) and to the at least one washing boiler vacuum connection (12);
- at least one boiler and milk can interim valve (14);
- at least one washing line valve (15);
- at least one drainage line (17) directly connected to the washing tank and boiler (2);
- at least one drainage valve (16) positioned exclusively on the at least one drainage line (17);
- at least one heating element (18);
- at least one float (22);
- at least one float bottom level sensor (23); and
- at least one float upper-level sensor (24).

4. The washing machine, for washing the bucket milking machine automatically after milking, of claim 3, wherein, the at least one vacuum direction and vacuum discharge valve (13) has a four way valve structure.

* * * * *